United States Patent [19]

Didier

[11] Patent Number: 5,461,270

[45] Date of Patent: Oct. 24, 1995

[54] ATTACHMENT DEVICE FOR SPEED SENSOR IN A MOTOR

[75] Inventor: Ronald J. Didier, Sioux Center, Iowa

[73] Assignee: E. M. W. Groschopp, Inc., Sioux Center, Iowa

[21] Appl. No.: 241,418

[22] Filed: May 11, 1994

[51] Int. Cl.⁶ ................................................. H02K 37/00
[52] U.S. Cl. ................................... 310/68 B; 310/49 R
[58] Field of Search ......................... 310/38 B, 68 R, 310/DIG. 3, 90, 91, 71

[56] References Cited

U.S. PATENT DOCUMENTS

| | | | |
|---|---|---|---|
| 4,086,519 | 4/1978 | Persson | 318/254 |
| 4,364,005 | 12/1982 | Kohzai et al. | 322/31 |
| 4,492,906 | 1/1985 | Goto et al. | 318/488 |
| 4,642,496 | 2/1987 | Kerviel et al. | 310/68 B |
| 4,857,784 | 8/1989 | Mukaekubo | 310/68 B |
| 4,952,830 | 8/1990 | Shirakawa | 310/68 B |
| 4,988,905 | 1/1991 | Tolmie, Jr. | 310/68 B |
| 5,010,263 | 4/1991 | Murata | 310/68 B |
| 5,038,088 | 8/1991 | Arends et al. | 318/565 |
| 5,293,125 | 3/1994 | Griffen et al. | 324/173 |
| 5,369,322 | 11/1994 | Maruyama et al. | 310/39 |

Primary Examiner—Steven L. Stephan
Assistant Examiner—D. R. Haszko

[57] ABSTRACT

A device for providing a low-cost mounting arrangement for a hall effect device to sense the speed of an electric motor. The device uses a plastic base fixed to or integrated into the motor bearing support and designed to hold a standard mass termination connector, hall effect device and leadwire harness which passes digital information to a circuit board for motor speed control.

4 Claims, 1 Drawing Sheet

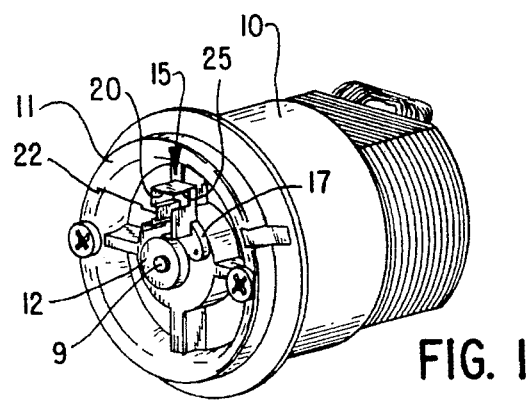
FIG. 1
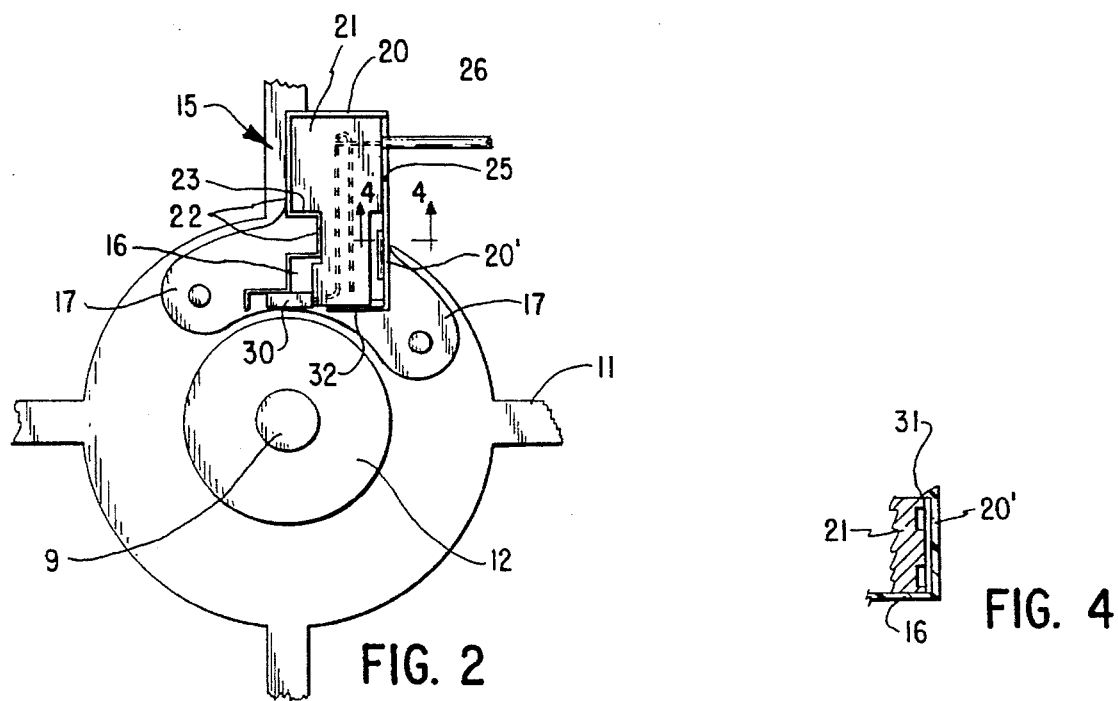
FIG. 2
FIG. 4
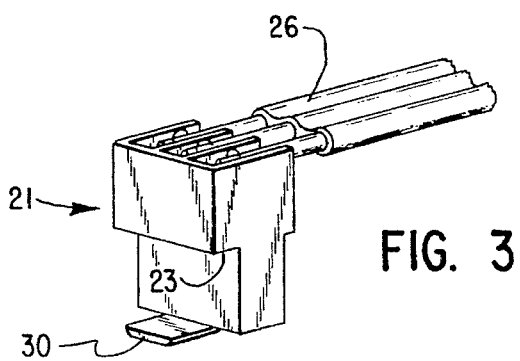
FIG. 3

ATTACHMENT DEVICE FOR SPEED SENSOR IN A MOTOR

BACKGROUND AND SUMMARY OF THE INVENTION

This invention pertains to speed controls for electric motors, the rotative speed of which must be controlled and where response to changes of in load torques may be present. Such motors are well known and there have been controls which accomplish the purpose.

Prior controls, however, ordinarily use circuit boards built into the motor. While such controls do provide for the necessary response and adequate control, they are expensive, both to build and to repair.

By the present invention, a mass termination assembly (MTA) or ribbon cable connector is held adjacent to the motor by the plastic base. A hall effect device installed in the MTA can then be positioned in close proximity of a magnet attached to the motor shaft. The hall effect device will transmit electrical information to a separate control board to regulate the speed of the motor.

BRIEF DESCRIPTION OF THE DRAWINGS

FIG. 1 is a perspective view from the sensing end of the motor showing the plastic base in place, but without the MTA, FIG. 2 is a detailed view of the base with the MTA and hall effect device engaged in the clip, FIG. 3 is a detailed view to an enlarged scale of the MTA and hall effect device, and FIG. 4 is a sectional view from line 4—4 of FIG. 2.

DESCRIPTION

Briefly this invention comprises a small assembly for attachment to an electric motor to hold a hall effect device in place. That device senses the rotational speed of the motor so that the speed can be adjusted promptly to hold the motor at virtually constant speed.

More particularly, and referring to the figures, the assembly is used in conjunction with an electric motor 10 having a bearing support 11 at one end. A shaft 9 is journalled in the bearing support 11 and supports the armature (not shown). Outboard of the bearing support 11 the shaft is designed to support a magnet 12 which can be sensed by the adjacent hall effect device 30.

A plastic base 15 is mounted on the bearing support 11 adjacent the magnet 12. This mounting base 15 has a back wall 16 lying adjacent the bearing support 11 and having a pair of mounting ears 17 by which the clip can be riveted or held by screws to the motor. It will be obvious that the base 15 could be integrated into the bearing support 11 if that support were to be made of plastic.

Side walls 20 extending from the back wall 16 are shaped to fit the MTA 21. These walls include an inset portion 22 adapted to engage a shoulder 23 on the MTA 21 for holding the MTA 21 inside the walls 20 and in proper position relative to the magnet 12. A notch 25 in the side wall is provided to allow wires 26 to extend from the MTA 21 outwardly to the control board on the responding device (not shown). A small portion of the bottom wall 32 extends to the front of the MTA to prevent the hall effect device 30 from sliding into the magnet 12.

The wires 26 are connected to metal clips on top of the MTA 21. The metal clips within the MTA extend to the opposite end where the wires from the hall effect device 30 are inserted and hence make connection to wires 26. The hall effect device is adapted to react to the magnet on the shaft and send electrical impulses along the wires to a control board. These impulses are used to indicate the speed at which the shaft is turning. Such pickup devices are readily available from manufacturers. One example is manufactured by Micro Switch as catalogue #SS41.

In order to retain the MTA 21 within the walls 20, one lateral wall 20'—shown in section in FIG. 4—is formed with a retaining clasp 31 adapted to extend over the edge of the holder as shown there. Thus, the MTA 21 can be slid into the walls 20 from the side opposite the back wall 16 until the clasp 31 snaps over the edge of the MTA 21. Then, if it is desired to replace the MTA, it can readily be removed by manually spreading the lateral wall 20' until the holder can be moved outwardly past the clasp 31 and the holder then can be slid out of the walls and replaced.

I claim as my invention:

1. In combination with an electric motor having a bearing support with an armature or rotor shaft rotatably journalled in said bearing support, a device for sensing the speed of rotation of said shaft comprising markers on said shaft, pickup means adjacent said shaft to convert the sensing of passage of said markers into electrical impulses, and base means affixed to said bearing support to hold said pickup means releasably in position adjacent said shaft, said pickup means includes a holder, a pickup fastened to said holder, and said base means having walls adapted to retain said holder releasably within said walls;

and a portion of said walls provides a clamp extending beyond the base means, said portion of said walls being able to be flexed to hold said base means releasably within said walls.

2. The combination of claim 1 in which said walls are affixed to a rear wall, said rear wall having extended ears, said ears providing attachment means in which said base means is fixed to said end plate.

3. The combination of claim 1 in which said base means includes one wall formed with an inset, said holder having a shoulder adapted to engage said inset on said wall to properly position said pickup adjacent said shaft.

4. The combination of claim 1 in which said bearing support is formed of a plastic material, said base means being integrally formed with said bearing support.

* * * * *